United States Patent [19]
Foster

[11] Patent Number: 5,458,736
[45] Date of Patent: Oct. 17, 1995

[54] METHOD FOR PRODUCING RECYCLED MATERIALS FOR HYGIENIC END USES

[75] Inventor: James J. Foster, Clifton Forge, Va.

[73] Assignee: Westvaco Corporation, New York, N.Y.

[21] Appl. No.: 188,911

[22] Filed: Jan. 31, 1994

[51] Int. Cl.⁶ .................................................. D21C 5/02
[52] U.S. Cl. ............................. 162/7; 162/4; 162/8
[58] Field of Search .................................. 162/4, 7, 8, 82

[56] References Cited

U.S. PATENT DOCUMENTS

| | | | |
|---|---|---|---|
| 2,582,496 | 1/1952 | Massey et al. | 92/1.5 |
| 2,959,513 | 11/1960 | Savage | 162/6 |
| 4,917,706 | 4/1990 | Meszaros | 8/652 |
| 5,211,809 | 5/1993 | Naddeo et al. | 162/6 |
| 5,234,544 | 8/1993 | Naddeo | 162/5 |
| 5,298,168 | 3/1994 | Guess | 210/713 |

*Primary Examiner*—W. Gary Jones
*Assistant Examiner*—Dean T. Nguyen
*Attorney, Agent, or Firm*—J. R. McDaniel; R. L. Schmalz

[57] ABSTRACT

This invention relates to a method for producing packaging materials containing reclaimed/recycled fiber by chemically hydrolyzing the fiber, treating the fiber at elevated temperature greater than 100° C., adding a reduced sulfur agent to the fiber to reduce the sulfur content of the fiber by forming insoluble heavy metal sulfide compounds which precipitate from the hydrolyzed fiber, oxidizing and then washing the fiber to produce a paper pulp. Such methods of this type, generally, produce reclaimed/recycled fiber that is sufficiently hygienic for food grade and medical device packaging applications.

7 Claims, 1 Drawing Sheet

5,458,736

METHOD FOR PRODUCING RECYCLED MATERIALS FOR HYGIENIC END USES

BACKGROUND OF THE INVENTION

1. Field of the Invention

This invention relates to a method for producing packaging materials containing reclaimed/recycled fiber. Such methods of this type, Generally, produce reclaimed/recycled fiber that is sufficiently hygienic for food Grade and medical device packaging applications.

2. Description of the Related Art

Recycling of materials to produce paper has had a long history in America. One of the first paper mills in America was a facility that recycled old rags into paper. Since then, recycled/reclaimed fibers have been used in a variety of applications but, primarily in paperboard and printing and writing grades. Typically, the recycled material has visible contaminates that must be removed or reduced before the material can be reintroduced into the papermaking process. This reduction/removal of visible contaminates usually is done by using cyclone cleaners, deinking units, chemical dispersion or the like.

While reduction/elimination of the visible contaminants is sufficient for printing and writing applications, a higher standard is required when recycled materials are used in food contact or medical device packaging applications. To use reclaimed/recycled fiber in direct food contact or medical device packaging, one must ensure that the material is safe and uncontaminated. This extends beyond the reduction/elimination of physical contaminants to mitigation of substances that are poisonous and deleterious. However, these poisonous and deleterious substances may not be visible.

It is known to produce microbial free recycled paper from household sources. The object of this process is to mitigate micro-biological contamination in the recycled fiber. This is achieved mainly through heat disinfection. The recycled paper is heated at 102°–104° C. for 15–18 hours which disinfects the microbial portion of the recycled material. While this process reduces the microbiological contamination of the reclaimed fiber and removes some highly volatile/low boiling point contaminants, this process does not affect other potential contaminants of hygienic concern such as, heavy metals, printing inks or optical brighteners. Therefore, a more advantageous method would be one which substantially eliminates all potential contaminants.

It is apparent from the above that there exists a need in the art for a method which produces paper from recycled/reclaimed fibers, but which at the same time substantially eliminates all potential contaminates found in the recycled/reclaimed fibers. It is a purpose of this invention to fulfill this and other needs in the art in a manner more apparent to the skilled artist once given the following disclosure.

SUMMARY OF THE INVENTION

Generally speaking, this invention fulfills these needs by providing a method for producing paper for hygienic end uses from recycled paper, wherein the method is comprised of the steps of: chemically hydrolyzing a recycled paper; treating the hydrolyzed gaper at elevated temperatures greater than 100° C.; reducing a sulfur content of the heated paper; chemically oxidizing the sulfur reduced paper; and washing the oxidized paper to produce a paper pulp which can be formed into a paper web for hygienic end uses.

In certain preferred embodiments, the oxidation step is carried out with one or more of the following chemicals: chlorine; chlorine dioxide; ozone or elemental oxygen. The hydrolyzing step is accomplished by treating the recycled fiber with a strong caustic solution. Also, the sulfur reducing step allows the reduced sulfur to react with the recycled pulp to form essentially insoluble metal sulfide compounds so that these compounds can precipitate from the caustic solution. Finally, the washing step is carried out with water.

In another further preferred embodiment, the multiple step process exposes the recycled fiber to chemical, thermal and physical treatments to produce a pulp with a hygienicity sufficiently high enough for food and medical packaging applications. The multiple step process provides many routes of contaminant removal thereby decreasing the probability of harmful substances remaining in the pulp.

The preferred method for producing hygienic paper, according to this invention, offers the following advantages: ease of contaminate removal; decreased probability of harmful substances remaining in the pulp; good stability; good durability and excellent economy. In fact, in many of the preferred embodiments, these factors of ease of contaminant removal, decrease in the probability of harmful substances remaining in the pulp and excellent economy are optimized to an extent that is considerably higher than heretofore achieved in prior, known methods for producing hygienic paper.

BRIEF DESCRIPTION OF THE DRAWING

The above and other features of the present invention, which will become more apparent as the description proceeds, are best understood by considering the following detailed description in conjunction with the accompanying drawing, wherein.

DETAILED DESCRIPTION OF THE INVENTION

Figure 1:
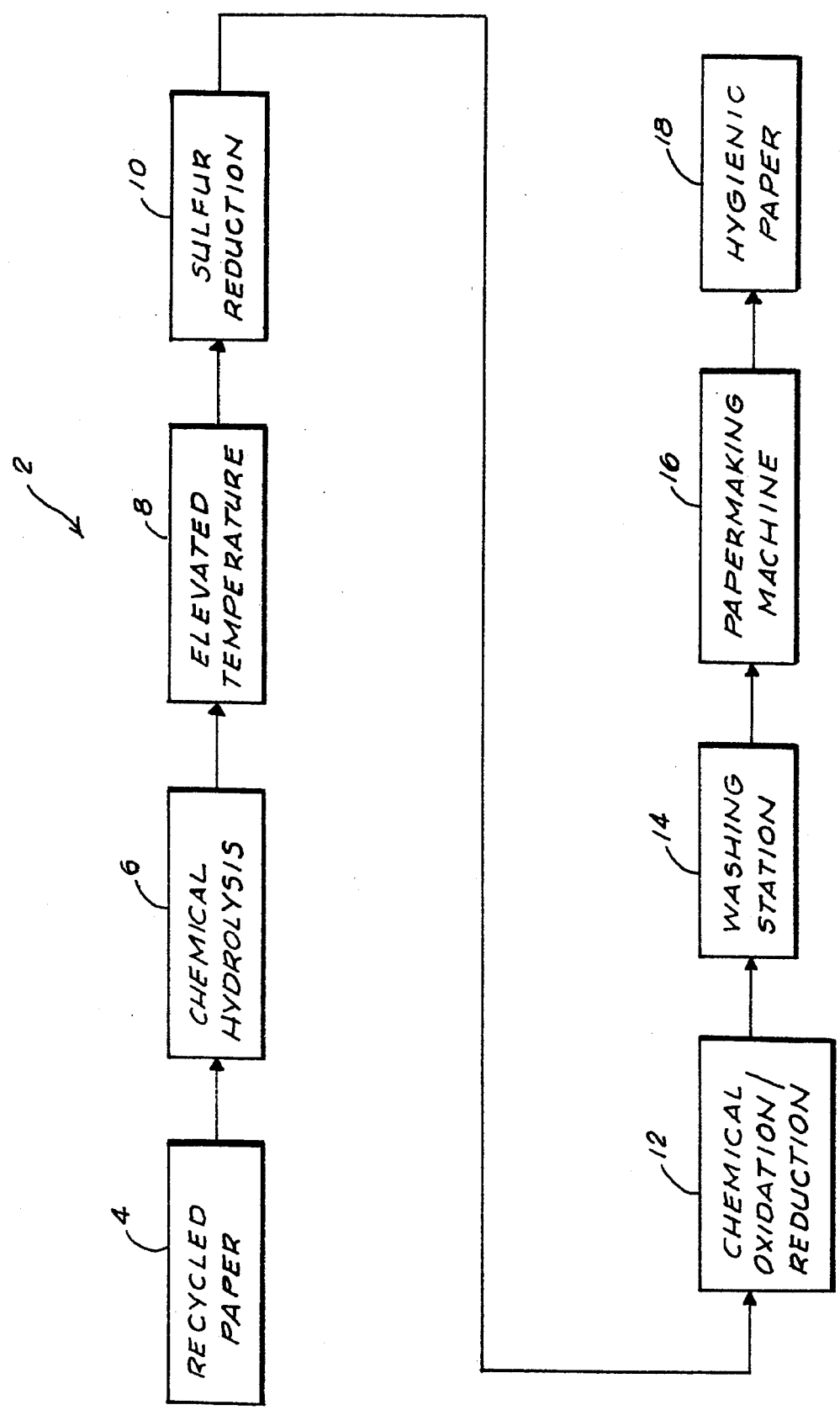
FIG. 1 is a schematic illustration of a method for producing paper for hygienic end uses from recycled fiber, according to the present invention.

The present invention consists of a multiple step process to expose the recycled fiber to chemical, thermal, and physical treatments to produce a paper 18 with hygienicity sufficiently high enough for food and medical packaging applications. Fiber sources suitable for recycling, pursuant to the present invention, may include corrugated box plant clipping characterized as double line kraft (DLK) and post-consumer packaging such as old corrugated containers (OCC), kraft bagging, newspapers, newsprint, telephone directories and office waste. This multiple step process 2 combines many routes of contaminant removal thereby decreasing the probability that hazardous substances might remain in paper 18.

For example, during the treatment of process 2, some contaminants react during the chemical treatments and are removed physically by subsequent solvent washings. Other contaminants volatilize or sublime during the thermal treatment. By having a multiple step process 2, contaminants unaffected in one treatment may react with a different treatment. This multi-step process 2 mitigates most known and potential contaminants found within recycled paper 4.

The process 2 consists of exposing recycled fiber 4 in the following chemical and physical environments: chemical hydrolysis 6; elevated temperatures 8; sulfur reduction 10; chemical oxidation/reduction 12; and washing station 14.

While one or two of the treatments may be skipped in certain applications, the use of all the treatments will ensure the safety and hygienicity of the product.

It is to be understood that after the pulp leaves washing station 14, the pulp enters a conventional papermaking machine 16 such as a fourdrinier papermaking machine which produces paper 18 having sufficiently high enough hygienic properties.

Chemical Hydrolysis Step

Chemical hydrolysis occurs when an organic compound reacts with a hydroxide. This is accomplished by treating recycled fiber 4 with a strong caustic solution at elevated temperatures and pressures. Preferably, the temperature is at 150° C. or below. Lower temperatures and pressures may also be used, however the treatment time will increase, accordingly. Hydrolysis can also occur through reaction with an $H^+$ ion which is accomplished by treating fiber 4 with an acid.

Chemical hydrolysis, as set forth in element 6, acts upon those organic compounds that contain ester and/or amine functional moieties. Poisonous and deleterious contaminants that contain these functional moieties include diethylamine and dimethylamine.

Elevated Temperature Step

There are may poisonous or deleterious materials that have a low boiling point or are highly volatile. By increasing the recycled pulp temperature, many of these compounds volatilize or sublimate. In the process of the present invention, the temperature is greater than 100° C. Examples of poisonous and deleterious compounds mitigated by exposure to elevated temperatures include ethylene oxide, dichloroethane, and methyl mercaptan.

Reduced Sulfur Step

Heavy metals are substances of toxicological concern. Metals such as lead and mercury have long been associated with adverse health effects. While the concentrations of these heavy metals are not expected to be great in recycled fiber, they will be present, nonetheless.

In the process, as set forth in sulfur reduction step 10 of system 2, reduced sulfur reacts with recycled pulp to form essentially insoluble metal sulfide compounds. These metal sulfides precipitate from the solution. This is because heavy metal sulfides are some of the most insoluble substances known. By forming these sulfides, these heavy metals are no longer available for reaction and/or migration. If these substances cannot migrate or react, they are no longer substances of toxicological concern. In the current process, the preferred source for reducing the sulfur is sodium sulfide (NaSH).

Chemical Oxidation/Reduction Step

A chemical substance is said to be oxidized when it loses electrons and a substance is reduced when it gains electrons. In the present invention, the recycled fiber 4 is oxidized with one or more of the following chemicals: chlorine; chlorine dioxide; ozone or elemental oxygen. It is to be understood that this is not an all inclusive list. The time and temperature of the oxidation treatment will depend on the oxidizing compound used and on the extent and type of contamination exhibited by the recycled fiber 4.

The important aspect of the chemical oxidation step 12 is that it mitigates poisonous and deleterious compounds. Examples of poisonous or deleterious substances mitigated during oxidation/reduction include polynuclear compounds such as pyrene, pesticides such as Aldrin and certain organic pigments.

The chemical oxidation described above has the additional benefit of removing a wide range of visible contaminants. These visible contaminants include substances like printing inks and dirt.

Chemical reduction can also be used for a similar mitigating effect on contaminants. The specific contaminants mitigated by chemical reduction may differ from those described in the oxidation process.

Washing Step

Treatments based on chemically reacting the poisonous/deleterious contaminants in the recycled pulp may not be sufficient to make the recycled paper sufficiently hygienic for food grade or medical packaging applications. The reason is, while the poisonous or deleterious substances may be degraded in these processes, the reaction by-products may be still present. Solvent washings, as set forth by washing step 14, can remove many of these reaction by-products and poisonous and deleterious substances.

Solvent washing is performed by diluting the reduced material with a suitable solvent and then physically removing the excess solvent through use of a conventional screen or screw press. While washing can be accomplished by several different processes, the most preferable is a conventional counter current washing process. Counter current washing treats the "cleanest" pulp with the "cleanest" solvent. The solvent removed from this stage is reused in the previous pulp washing stage. Preferably, the solvent used in the present invention is water.

Current Process Treatment

In its current embodiment, the multi-step process 2 consists of treating the fiber in the following unit operations. The fiber is first conventionally digested. The fiber is then subjected to chlorine bleaching. Next, the fiber is subjected to a caustic extraction. After the caustic extraction, two stages of chlorine dioxide bleaching are used. After the bleaching step, multiple solvent washings with water are employed at various process stages, such as during the bleaching and the caustic extraction stages. Finally, the entire process is carried out at temperatures in excess of 100° C.

It is to be understood however that multi-step process 2, as set forth in the current treatment, as described above, does not preclude substitution of other treatments into the process. Such other treatments may include, but are not limited to, oxygen delignification, ozone bleaching, and extended digestion.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for producing paper for hygienic end uses from recycled paper, wherein said method is comprised of the steps of:

chemically hydrolyzing a recycled paper;

treating said hydrolyzed paper at elevated temperatures greater than 100° C.;

treating said heated, hydrolyzed paper with a reduced sulfur agent by forming essentially insoluble metal sulfide compounds which precipitate from said hydrolyzed paper;

chemically oxidizing said hydrolyzed paper: and washing said oxidized paper to produce a paper pulp which can be formed into a paper wed for hygienic end uses wherein insoluble metal sulfide compounds are reduced in said paper.

2. The method, of claim 1 wherein said oxidizing step further comprises bleaching said recycled paper.

3. The method, of claim 1 wherein said hydrolyzing step further comprises hydrolyzing said paper with an acidic solution.

4. The method of claim 1 wherein said reduced sulfur agent is NaSH.

5. The method of claim 1 wherein said washing step further comprises washing said paper with water.

6. The method of claim 1 which further comprises delignifying said paper through the use of an oxygen compound.

7. The method of claim 1 which further comprises digesting said paper.

\* \* \* \* \*